United States Patent
Makara et al.

(10) Patent No.: US 10,690,897 B2
(45) Date of Patent: Jun. 23, 2020

(54) LASER SCANNING MICROSCOPE APPARATUS

(71) Applicant: CANON KABUSHIKI KAISHA, Tokyo (JP)

(72) Inventors: Koji Makara, Yokohama (JP); Yoichi Otsuka, Neyagawa (JP); Masafumi Kyogaku, Yokohama (JP); Hiroyuki Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 15/132,053

(22) Filed: Apr. 18, 2016

(65) Prior Publication Data

US 2016/0306152 A1 Oct. 20, 2016

(30) Foreign Application Priority Data

Apr. 20, 2015 (JP) ................................. 2015-086266
Feb. 5, 2016 (JP) ................................. 2016-020932

(51) Int. Cl.
*G02B 21/00* (2006.01)
*G01N 21/65* (2006.01)
*G01N 21/64* (2006.01)

(52) U.S. Cl.
CPC ....... *G02B 21/008* (2013.01); *G01N 21/6428* (2013.01); *G01N 21/6458* (2013.01); *G01N 21/65* (2013.01); *G02B 21/0032* (2013.01); *G02B 21/0036* (2013.01); *G02B 21/0064* (2013.01); *G02B 21/0076* (2013.01);

(Continued)

(58) Field of Classification Search
None
See application file for complete search history.

(56) References Cited

U.S. PATENT DOCUMENTS 5,260,562 A * 11/1993 Bearden ............... G02B 21/002
250/216
5,351,152 A * 9/1994 Kuo ................... G02B 21/0032
359/234

(Continued)

FOREIGN PATENT DOCUMENTS

EP 1895347 A1 3/2008
JP 9-281405 A 10/1997

(Continued)

*Primary Examiner* — Dominic J Bologna
(74) *Attorney, Agent, or Firm* — Canon U.S.A. Inc., IP Division

(57) ABSTRACT

A laser scanning microscope apparatus includes an irradiation unit including an objective lens, a photodetector unit, an XY-scanning unit, and a Z-scanning unit. The irradiation unit focuses a laser beam with the objective lens to a specimen. The photodetector unit detects light generated from a position irradiated with the laser beam focused. The XY-scanning unit scans the laser beam in an X-direction perpendicular to an optical axis of the objective lens and in a Y-direction perpendicular to the optical axis and the X-direction. The Z-scanning unit scans the laser beam in a Z-direction parallel to the optical axis. When acquiring XY-two-dimensional image data by detecting the light while scanning the irradiated position in the X-direction and the Y-direction, the apparatus detects the light while scanning the irradiated position also in the Z-direction.

10 Claims, 10 Drawing Sheets

(52) U.S. Cl.
CPC ............... *G01N 2021/655* (2013.01); *G01N 2201/06113* (2013.01); *G01N 2201/105* (2013.01)

(56) References Cited

U.S. PATENT DOCUMENTS

| | | | | |
|---|---|---|---|---|
| 5,594,235 | A * | 1/1997 | Lee | G01N 21/94 250/201.3 |
| 6,657,216 | B1 * | 12/2003 | Poris | G01B 11/0608 250/216 |
| 8,686,363 | B1 * | 4/2014 | Timlin | G02B 21/0032 250/339.07 |
| 2003/0007145 | A1 * | 1/2003 | Shimada | G02B 21/002 356/301 |
| 2003/0222197 | A1 * | 12/2003 | Reese | G02B 21/367 250/206 |
| 2007/0176085 | A1 * | 8/2007 | Leimbach | G02B 21/0032 250/234 |
| 2007/0268574 | A1 * | 11/2007 | Sasaki | G02B 21/0032 359/385 |
| 2011/0296562 | A1 | 12/2011 | Beaurepaire et al. | |
| 2014/0356881 | A1 * | 12/2014 | Satoh | G01N 21/65 435/7.1 |

FOREIGN PATENT DOCUMENTS

WO    2009/129802 A1    10/2009
WO    2014/115341 A1    7/2014

\* cited by examiner

LASER SCANNING MICROSCOPE APPARATUS

BACKGROUND OF THE INVENTION

Field of the Invention

The present invention relates to a laser scanning microscope apparatus.

Description of the Related Art

When a specimen is observed with a microscope, the area of a field of view observed at a time is limited by the area of the field of view of an objective lens. For this reason, when a specimen larger than the field of view of the objective lens is observed, the whole of the specimen cannot be observed at a time.

For a pathologic diagnosis, observation of the whole of the specimen is required in order to prevent oversight of the observation target. To this end, in the pathologic diagnosis, a target area is determined by observing a relatively large area of a specimen using a low-magnification objective lens before a specific target area is observed in detail using a high-magnification objective lens.

A known method for acquiring an image of an area larger than a single field of view of a microscope is a method for acquiring a large image by acquiring a plurality of images by moving a field of view in directions (an X-direction and a Y-direction) perpendicular to the optical axis (a Z-direction) of the microscope and combining the plurality of acquired images. However, if the specimen is wavy, the position of the specimen in the Z-direction (Z-coordinate) can differ from field to field, in which case moving the field of view in the X-direction and the Y-direction can cause misalignment of the in-focus plane of the microscope and the specimen.

Japanese Patent Laid-Open No. 9-281405 discloses a microscope system that acquires a large area focused image by performing a focusing operation every time the field of view is shifted in the X-direction and the Y-direction.

The microscope system disclosed in Japanese Patent Laid-Open No. 9-281405 acquires a large-area image by repeating a series of operations of adjusting the focus on the specimen and acquiring an image in the field of view every time the field of view is shifted. This has a problem in that significantly much time is required to acquire a large-area image.

SUMMARY OF THE INVENTION

A laser scanning microscope apparatus according to an aspect of the present invention includes an irradiation unit including an objective lens, a photodetector unit, an XY-scanning unit, and a Z-scanning unit. The irradiation unit is configured to focus a laser beam with the objective lens to a specimen. The photodetector unit is configured to detect light generated from a position irradiated with the focused laser beam. The XY-scanning unit is configured to scan the laser beam applied to the specimen with the irradiation unit in an X-direction perpendicular to an optical axis of the objective lens and in a Y-direction perpendicular to the optical axis and the X-direction. The Z-scanning unit is configured to scan the laser beam applied to the specimen with the irradiation unit in a Z-direction parallel to the optical axis of the objective lens. When acquiring XY-two-dimensional image data in which information of the detected light is stored for each pixel corresponding to an X-coordinate and a Y-coordinate of the irradiated position by detecting the light while scanning the irradiated position in the X-direction and the Y-direction with the XY-scanning unit, the apparatus is configured to detect the light while scanning the irradiated position also in the Z-direction with the Z-scanning unit to acquire XY-two-dimensional image data including at least two pixels in which information of the light generated from irradiated positions at different Z-coordinates is individually stored.

Further features of the present invention will become apparent from the following description of exemplary embodiments with reference to the attached drawings.

DESCRIPTION OF THE EMBODIMENTS

Laser scanning microscope apparatuses according to some embodiments of the present invention will be described hereinbelow. It is to be understood that these embodiments are given for mere illustration and that the present invention is not limited to the configurations and numerical values described in the embodiments, and any other configurations and numerical values may be selected as appropriate.

First Embodiment

Apparatus Configuration

Figure 1:
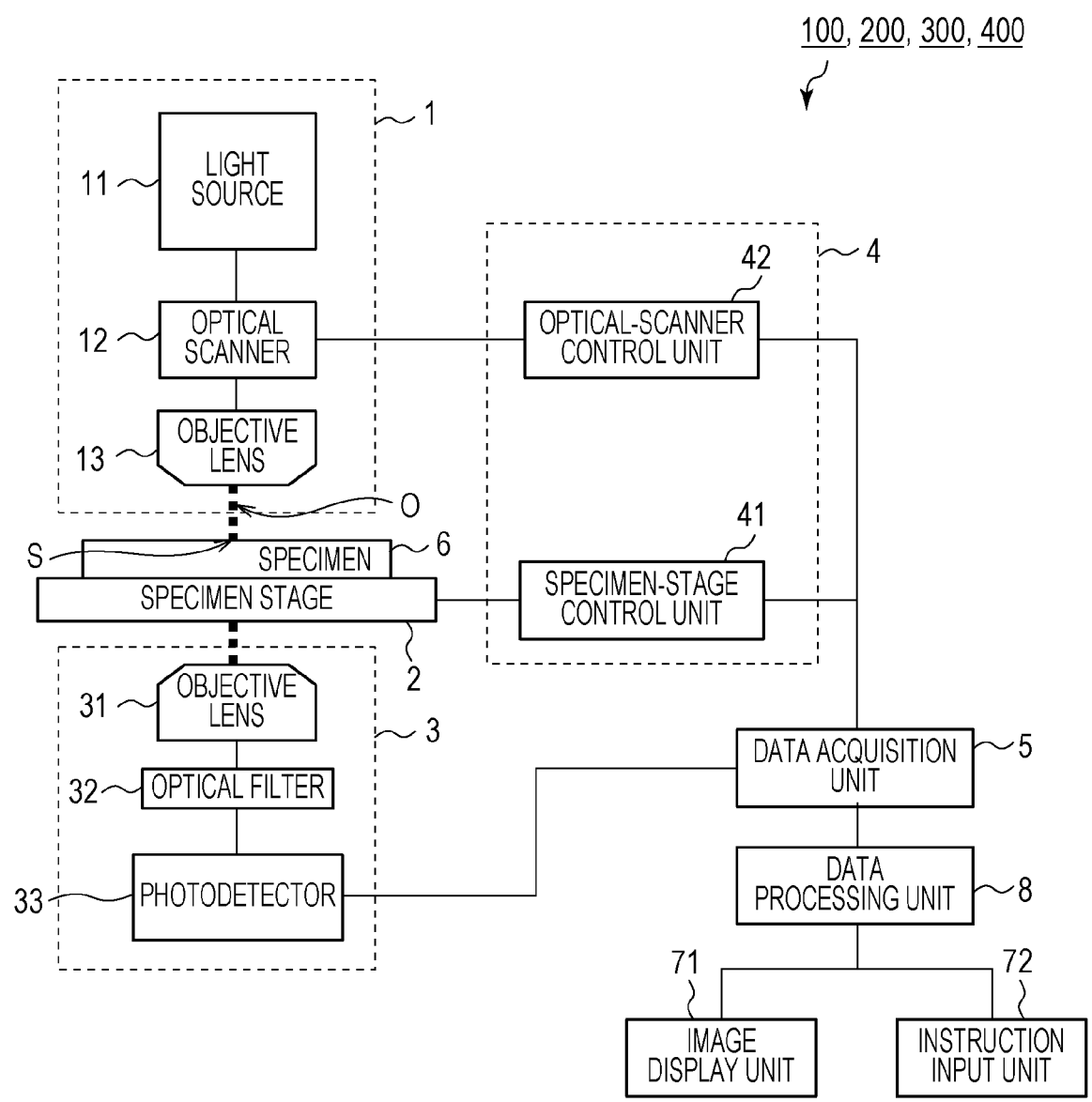
FIG. 1 is a diagram schematically illustrating the configuration of a laser scanning microscope apparatus according to a first embodiment of the present invention.

First, the configuration of a laser scanning microscope apparatus 100 (hereinafter referred to as "apparatus 100") according to a first embodiment will be described with reference to FIG. 1. FIG. 1 is a diagram schematically illustrating the configuration of the apparatus 100.

The apparatus 100 applies a laser beam as a spot to at least part of the interior or the surface of a specimen 6 and detects fluorescence or light generated due to a nonlinear optical phenomenon (hereinafter referred to as "light L") from a position S irradiated with the laser beam. The apparatus 100 scans the laser beam over the irradiated position S of the specimen 6 to detect the light L. Thus, the apparatus 100 acquires the two-dimensional distribution information of the light L to thereby acquire two-dimensional image data on the specimen 6. When detecting the light L, the apparatus 100 may directly detect the light L, which is generated from the irradiated position S, or alternatively, may detect reflected light, transmitted light, or scattered light of the laser beam applied to the specimen 6, and then detect the light L from its intensity change.

The apparatus 100 may be any kind of laser scanning microscope apparatus that focuses a laser beam as a spot to the specimen 6 and scans the irradiated position S in the interior or on the surface of the specimen 6. Specific examples include a nonlinear optical microscope apparatus and a confocal laser microscope apparatus. The nonlinear optical microscope apparatus is a microscope apparatus using a nonlinear optical effect. Examples of the nonlinear optical effect include multiphoton excitation, multiphoton absorption, stimulated Raman scattering (SRS), coherent anti-Stokes Raman scattering (CARS), coherent Stokes Raman scattering (CSRS), and second harmonic generation (SHG).

As shown in FIG. 1, the apparatus 100 includes an irradiation unit 1, a specimen stage 2, a photodetector unit 3, a control unit 4, a data acquisition unit 5, and a data processing unit 8.

The irradiation unit 1 includes a light source 11, an optical scanner 12, and a first objective lens 13. The irradiation unit 1 focuses a laser beam emitted from the light source 11 with the first objective lens 13 to irradiate the interior or the surface of the specimen 6 as a spot.

The light source 11 emits a laser beam. The kind of laser beam emitted from the light source 11 is not limited to a particular light beam; any wavelength band, any output, and either of pulsed light and continuous wave light may be selected. Although the apparatus 100 of this embodiment includes only one light source, a plurality of light sources may be disposed. The apparatus 100 may be a SRS microscope apparatus that uses a first laser and a second laser at the same time. In another embodiment, the apparatus 100 is a laser scanning fluorescence microscope apparatus that includes as the light source 11 a plurality of lasers corresponding to the excitation wavelengths of a plurality of fluorochromes in the specimen 6. The apparatus 100 may be a fluorescence microscope apparatus that includes a wavelength-tunable light source as the light source 11 so that the operator can select a wavelength as necessary to selectively excite the fluorochromes in the specimen 6. If the light source 11 includes a plurality of light sources, the apparatus 100 may further include a multiplexer that multiplexes laser beams emitted from the plurality of light sources 11 of the irradiation unit 1.

The optical scanner 12 scans the position S irradiated with the laser beam, which is emitted from the light source 11 and focused as a spot to the specimen 6 by the first objective lens 13, in a planar direction (hereinafter referred to as "XY-direction") perpendicular to the optical axis O of the first objective lens 13. In other words, the optical scanner 12 is an X-scanning unit that scans the spot irradiated position S in the X-direction perpendicular to the optical axis O. The optical scanner 12 also serves as a Y-scanning unit that scans the spot irradiated position S in the Y-direction perpendicular to the optical axis O and the X-direction. In other words, the optical scanner 12 is an XY-scanning unit that scans the spot irradiated position S in the X-direction and the Y-direction.

The first objective lens 13 focuses the laser beam emitted from the light source 11 to the specimen 6 as a spot.

The specimen stage 2 is a stage on which the specimen 6 is placed. The specimen 6 is placed on the specimen stage 2 by the operator so as to be disposed between the first objective lens 13 and a second objective lens 31 (described later). The specimen stage 2 can be moved by the control unit 4 in a direction parallel to the optical axis O (hereinafter referred to as "Z-direction") or in the XY-direction. This allows the position of the specimen 6 placed on the specimen stage 2 relative to the apparatus 100 to be shifted, allowing the laser-beam scanning area scanned by the irradiation unit 1 to be shifted.

The photodetector unit 3 detects light generated from the position S in the interior or on the surface of the specimen 6 irradiated as a spot with the laser beam by the irradiation unit 1. This allows the photodetector unit 3 to acquire information on the specimen 6 from the spot irradiated position S. The photodetector unit 3 includes the second objective lens 31, an optical filter 32, and a photodetector 33.

The second objective lens 31 concentrates light including light generated from the spot irradiated position S in or on the specimen 6, such as fluorescence generated from the specimen 6 and a laser beam that has passed through the specimen 6. An example of the second objective lens is a condenser lens.

The optical filter 32 extracts light with a desired wavelength by intercepting light with a predetermined wavelength of the light concentrated by the second objective lens 31. For example, when a fluorescent substance is to be detected as the light L, the optical filter 32 intercepts light with the wavelength of light that excites phosphors in the specimen 6 and allows only light with the wavelength of fluorescence to be detected to pass through. If stimulated Raman scattered light is to be detected as the light L, the optical filter 32 intercepts light with the wavelength of one of two kinds of light applied to the specimen 6 and allows only light with the other wavelength to pass through.

The extraction of light with a desired wavelength may be performed with another method instead of using the optical filter 32. For example, instead of the optical filter 32, a spectrograph, such as a dichroic mirror and a diffraction grating, may be used.

The photodetector 33 detects light that has passed through the optical filter 32. The photodetector 33 receives the light that has passed through the optical filter 32 and converts the light to an electrical signal for output. At that time, the photodetector 33 outputs the electrical signal, with the intensity of the received light converted to the intensity of signal voltage. An example of the photodetector 33 is a photomultiplier tube (PMT). The photodetector 33 may be a combination of a photodiode and a lock-in amplifier.

The control unit 4 controls the optical scanner 12 and the specimen stage 2. The control unit 4 includes a specimen-stage control unit 41 and an optical-scanner control unit 42.

The specimen-stage control unit 41 controls driving of a motor (not shown) for moving the specimen stage 2 in the X-direction, the Y-direction, and the Z-direction.

The movement of the specimen stage 2 controlled by the specimen-stage control unit 41 is roughly classified into XY-movement and Z-movement.

The XY-movement is movement of the specimen stage 2 in the X-direction and the Y-direction. This shift the spot scanned area (hereinafter referred to as a "field of view") scanned by the irradiation unit 1 in the XY-direction. While the area of a field of view is limited by the first objective lens 13 and the optical scanner 12, the shifting of the field of view in the XY-direction with the XY-movement of the specimen stage 2 allows observation of an area larger than a single field of view.

Although this embodiment is configured to scan the spot in the X-direction and the Y-direction with the optical scanner 12 and to shift the field of view in the XY-direction with the specimen-stage control unit 41, the present invention is not limited to the configuration. In other words, the scanning of the spot in the X-direction and the Y-direction may be performed with the specimen stage 2. If the scanning of the spot in the X-direction and the Y-direction is performed with the specimen stage 2, a Z-scanning unit serves also as an XY-scanning unit. However, the scanning of the spot in the X-direction and the Y-direction may be performed using the optical scanner 12 because the optical scanner 12 allows higher-speed scanning.

Z-movement is movement of the specimen stage 2 in the Z-direction. This shifts the position of the spot irradiated by the irradiation unit 1 in the Z-direction. Moving the spot in the Z-direction allows observation, with the depth of the field of view in the specimen 6 varied. The apparatus 100 according to this embodiment allows the spot to be scanned in the Z-direction by the specimen-stage control unit 41 similarly to scanning of the spot in the X-direction and the Y-direction with the optical scanner 12. In other words, the specimen-stage control unit 41 and the specimen stage 2 in this embodiment serve as a Z-scanning unit. Although this embodiment is configured to shift the position of the spot in the Z-direction by moving the specimen stage 2 in the Z-direction with the specimen-stage control unit 41, the invention is not limited to the configuration. For example, the first objective lens 13 may be configured to be movable in the Z-direction, and the position of the spot in the Z-direction may be shifted by moving the first objective lens 13 in the Z-direction. In other words, the irradiation unit 1 may serve as the Z-scanning unit. For example, a piezoelectric element, a tuning fork, a motor, or a gear may be connected to the first objective lens 13, with which the relative positional relationship between the first objective lens 13 and the specimen 6 can be varied.

The data acquisition unit 5 acquires XY-two-dimensional image data, with the intensity of an electrical signal received from the photodetector unit 3 associated with the X-coordinate and the Y-coordinate of the position of the spot calculated from the amounts of control on the optical scanner 12 and the specimen stage 2. The data acquisition unit 5 may acquire XYZ-three-dimensional image data in which the Z-coordinate of the position of the spot is associated with the above information.

Although the apparatus 100 is a transmission laser scanning microscope apparatus, the apparatus 100 may be a reflection laser scanning microscope apparatus. In this case, in an example, the first objective lens 13 serves also as the second objective lens 31.

The data processing unit 8 receives data transmitted from the data acquisition unit 5 and processes the received data. The data processing unit 8 generates large-area image data by acquiring image data associated with different fields of view and combining the data. The data processing unit 8 can also visualize the components of the specimen 6 by processing various data including the XY-two-dimensional image data using a multivariate analysis technique or machine learning. The data processing unit 8 may include a storage unit (not shown) for temporarily storing various data or storing data processing results and various conditions for measurement.

The apparatus 100 may include an image display unit 71 and an instruction input unit 72.

The image display unit 71 is connected to the data processing unit 8 and displays the result of measurement, images generated by the data processing unit 8, and various conditions for measurement. An example of the image display unit 71 is a flat panel display.

The instruction input unit 72 is connected to the data acquisition unit 5 via the data processing unit 8 and receives various conditions for measurement input by an operator who uses the apparatus 100.

First Measuring Mode

Next, the operation of the apparatus 100 for acquiring XY-two-dimensional image data on a single field of view at a specific Z-coordinate will be described. In this specification, this operation is referred to as "first measuring mode".

A laser beam is emitted from the light source 11 into the optical scanner 12 and is scanned in the XY-direction by the optical scanner 12 so that the position of a spot focused by the first objective lens 13 is scanned in the XY-direction. The laser beam that has passed through the optical scanner 12 is focused by the first objective lens 13 and is applied as a spot in the interior of the specimen 6 or on the surface of the specimen 6.

The apparatus 100 (the photodetector unit 3) detects fluorescence as the light L, which is generated from the specimen 6 excited by the laser beam and passes through the specimen 6. The fluorescence generated from the spot in the interior of the specimen 6 or on the surface of the specimen 6 is concentrated by the second objective lens 31. At that time, the apparatus 100 concentrates not only the fluorescence generated from the specimen 6 but also the laser beam (excitation light) that has passed through the specimen 6 with the second objective lens 31. Although, in this embodiment, the apparatus 100 detects fluorescence as the light L, the light L is not limited to fluorescence. The light L include lights generated due to nonlinear optical effects, such as multiphoton excitation, multiphoton absorption, stimulated Raman scattering, coherent anti-Stokes Raman scattering, coherent Stokes Raman scattering, and second harmonic generation.

The light concentrated by the second objective lens 31 passes through the optical filter 32. The optical filter 32 according to this embodiment has different transmission characteristics according to the wavelength and is configured to intercept light with the wavelength of the laser beam (excitation light) emitted from the light source 11. Since the wavelength of fluorescence differs from the wavelength of a laser beam, using the optical filter 32 allows the laser beam (excitation light) to be intercepted and only the fluorescence to pass through.

The fluorescence that has passed through the optical filter 32 is guided to the photodetector 33. The photodetector 33 receives the fluorescence and outputs an electrical signal having a voltage corresponding to the intensity of the fluorescence.

The electrical signal output from the photodetector 33 is subjected to analog-to-digital conversion (AD conversion) with the data acquisition unit 5. The digital signal obtained by the AD conversion is transferred to a storage unit (not shown). The data acquisition unit 5 acquires information on the spot irradiated position S and information on the wavelengths of the excitation light and the fluorescence from the control unit 4. The data acquisition unit 5 generates XY-two-dimensional image data in which fluorescence intensity is stored for each pixel corresponding to the XY-coordinates on the basis of the thus-acquired various pieces of information.

Thus, the apparatus 100 can acquire XY-two-dimensional image data at a specific Z-coordinate. By moving the Z-coordinate of the spot with the Z-scanning unit, a plurality of pieces of XY-two-dimensional image data at different Z-coordinates (depths) can be acquired.

However, it takes much time to acquire a plurality of pieces of XY-two-dimensional image data at different Z-coordinates for different fields of view. Furthermore, this increases the amount of data acquired, and it takes much time to analyze the data. Therefore, when the field of view is to be shifted in the XY-direction to observe a large area, the number of pieces of XY-two-dimensional image data acquired for each field of view is preferably small. However, if XY-two-dimensional image data is acquired only at a specific Z-coordinate to reduce the number of pieces of XY-two-dimensional image data for each field of view, image data from which information on the specimen 6 cannot be obtained is generated from some field of view. This problem is pronounced particularly when the specimen 6 is a "wavy" (or undulating) specimen, so that the range of the Z-coordinate at which the specimen 6 is present differs according to the position in the XY-direction. Therefore, for large-area observation, the apparatus 100 acquires XY-two-dimensional image data in a "second measuring mode" described later.

Second Measuring Mode

Figure 2:
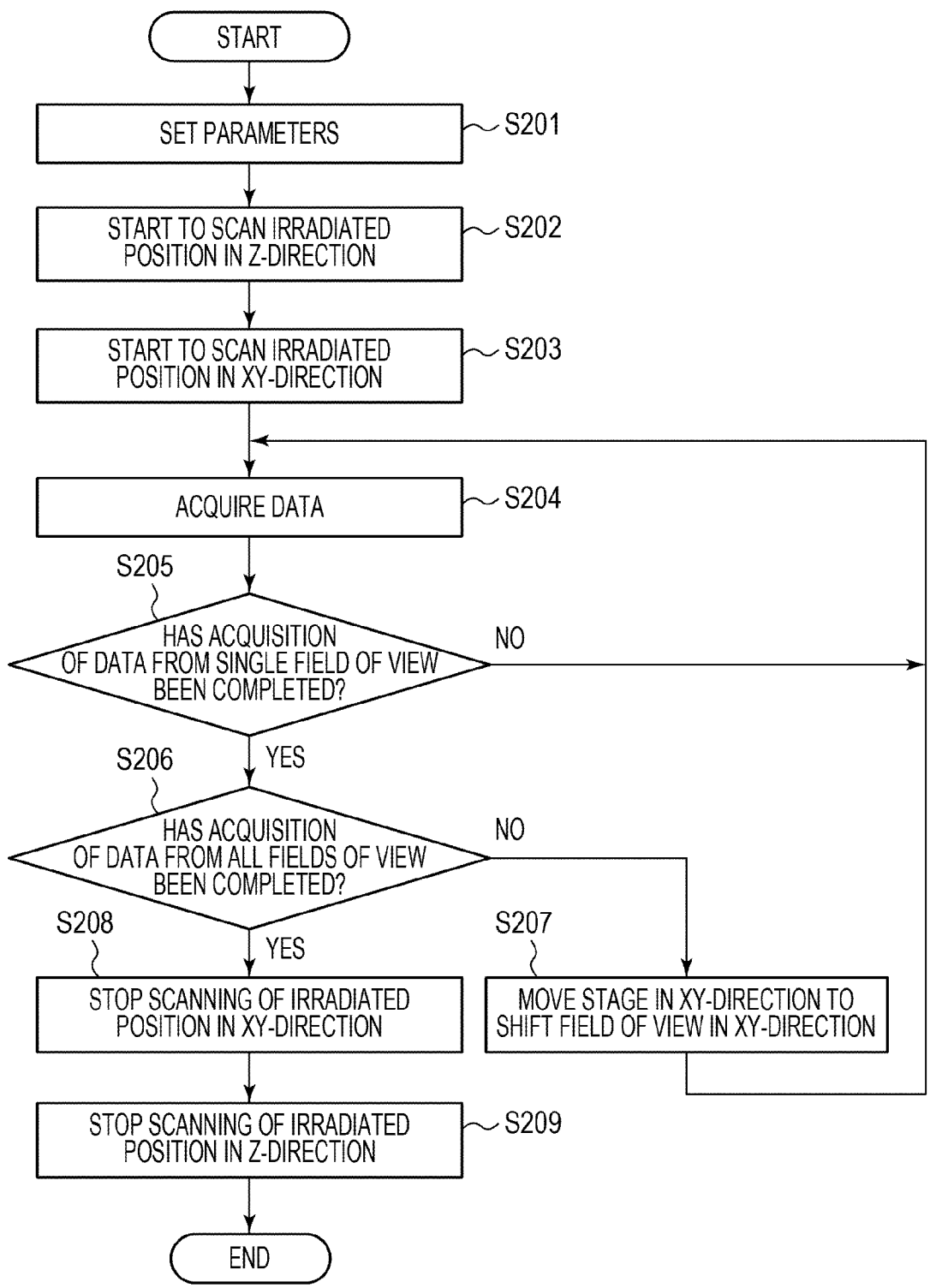
FIG. 2 is a flowchart illustrating the operation of the laser scanning microscope apparatus according to the first embodiment in a second measuring mode.
Figure 3A:
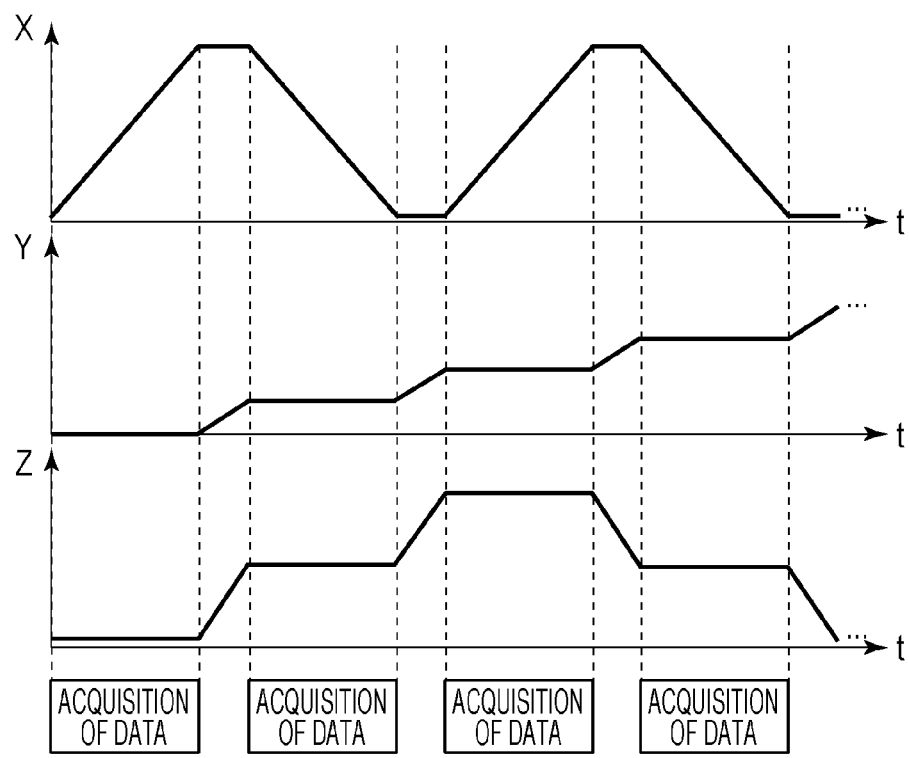
FIG. 3A is a diagram schematically illustrating changes in spot irradiated position with time and data acquisition timing according to the first embodiment.
Figure 3B:
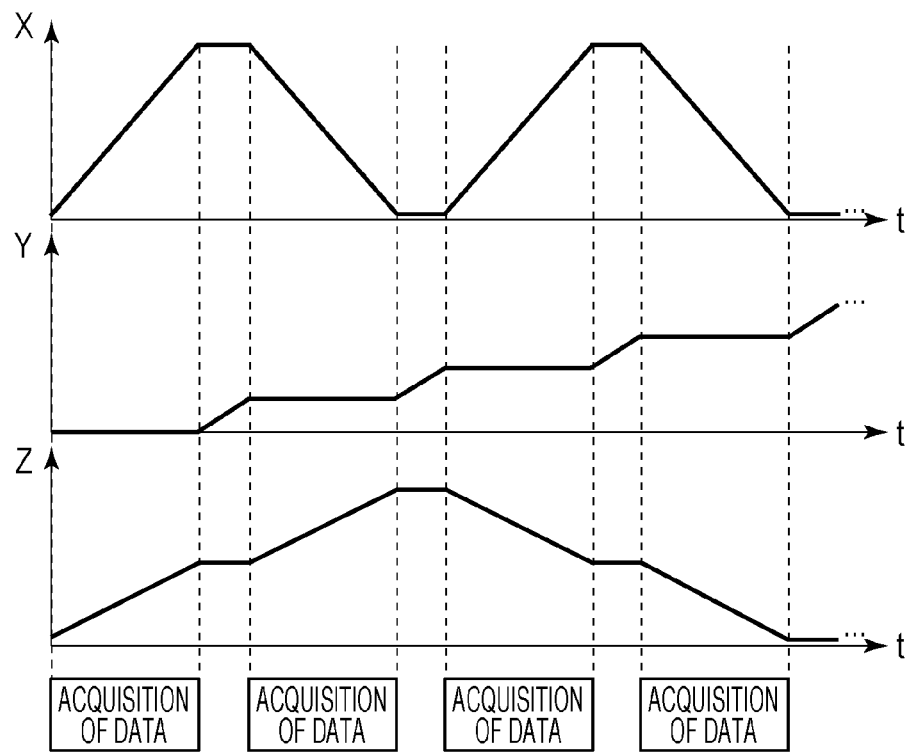
FIG. 3B is a diagram schematically illustrating changes in spot irradiated position with time and data acquisition timing according to the first embodiment.

The operation of the apparatus 100 in a second measuring mode will be described with reference to FIG. 2 and FIGS. 3A and 3B. FIG. 2 is a flowchart illustrating the operation of the apparatus 100 in the second measuring mode. FIGS. 3A and 3B are diagrams schematically illustrating changes in spot irradiated position S with time and data acquisition timing of the apparatus 100 in the second measuring mode.

First, the operator operates the instruction input unit 72 to move the specimen stage 2 in the Z-direction and inputs parameters for scanning the spot irradiated position S in the Z-direction (S201). At that time, the operator inputs as parameters the scanning range of the spot irradiated position S in the Z-direction and the scanning speed or scanning frequency of the spot irradiated position S to the instruction input unit 72.

The scanning range of the spot in the Z-direction is from the lower end to the upper end of the spot irradiated position S in the Z-coordinate, which corresponds to the moving range of the specimen stage 2 in the Z-direction. The scanning range of the spot in the Z-direction is set so as to include at least all of Z-coordinates at which the specimen 6 is present.

An example of the specimen 6 is a biological tissue section. In many cases, the specimen 6 is a thin specimen with a thickness of several micrometers. The specimen 6 is often sandwiched between a glass slide (not shown) and a cover glass (not shown) and is placed on the specimen stage 2 in a state in which it is held in liquid, such as water. For this reason, the specimen 6 is often "wavy", and the range of the Z-coordinate at which the specimen 6 is present differs according to the position in the XY-direction.

The specimen 6 may not be sandwiched between the slide glass (not shown) and the cover glass (not shown), as described above, and may be placed on the specimen stage 2 in a state in which it is simply placed on a slide glass (not shown). Also in this case, the range of the Z-coordinate at which the specimen 6 is present differs according to the position in the XY-direction.

If the specimen 6 is "wavy", as described above, the Z-coordinate at which the specimen 6 is present, which differs according to the position in the XY-direction, generally ranges from several micrometers to ten micrometers. For this reason, the range of scanning the spot in the Z-direction, which is set at S201, is preferably set twice to three times the above values. For example, if the waves of the specimen 6 are about 10 μm, the scanning range is preferably set to about 20 μm to 30 μm. This allows the scanning range of the spot in the Z-direction to be set so as to include the entire range of the Z-coordinate at which the specimen 6 is present. However, the values of the scanning range of the spot in the Z-direction are not limited to the above values and may be set freely according to the shape of the specimen 6.

In this embodiment, since scanning of the spot in the Z-direction is performed by moving the specimen stage 2 in the Z-direction, the scanning speed of the spot in the Z-direction corresponds to the moving speed of the specimen stage 2 in the Z-direction.

Next, the apparatus 100 starts to move the specimen stage 2 in the Z-direction on the basis of the parameters input by the operator to start to scan the spot irradiated position S in the Z-direction (S202). Subsequently, the apparatus 100 starts to scan the spot irradiated position S in the XY direction with the optical scanner 12 (S203). Thereafter, the apparatus 100 starts to acquire data with the data acquisition unit 5 (S204).

Thus, when the apparatus 100 acquires XY-two-dimensional image data by detecting the light L and acquiring data while scanning the spot irradiated position S in the X-direction and the Y-direction, the apparatus 100 detects the light L and acquires data while scanning the spot irradiated position S also in the Z-direction. In this embodiment, the scanning in the X-direction and the scanning in the Y-direction are periodically repeated until XY scanning in a single field of view is completed. The scanning in the Z-direction may also be periodically repeated until the XY scanning in a single field of view is completed. The scanning in the Z-direction may be performed by vibrating the specimen stage 2 in the Z-direction.

As shown in FIG. 3A, the apparatus 100 scans the spot irradiated position S in the Z-direction with the Z-scanning unit while the spot irradiated position S is scanned in the Y-direction with the XY-scanning unit. Alternatively, as shown in FIG. 3B, the apparatus 100 scans the spot irradiated position S in the Z-direction with the Z-scanning unit while the spot irradiated position S is scanned in the X-direction with the XY-scanning unit. Following is a description of FIG. 3A, which applies also to FIG. 3B.

In this embodiment, the X-direction scanning of the spot irradiated position S during XY-direction scanning is performed by "horizontal zigzag scanning" or "bidirectional scanning" in which scanning is reversed every scanning line. However, the scanning method of the present invention is not limited to the above method. For example, the apparatus 100 may adopt a scanning method in which scanning in the X-direction is always performed in the same direction to acquire data.

In this embodiment, as shown in FIG. 3A, while the spot irradiated position S is scanned in the X-direction, the spot irradiated position S is not scanned in the Z-direction. Upon completion of scanning in the X-direction and acquisition of data for one scanning line, the spot irradiated position S is scanned in the Y-direction. At that time, the apparatus 100 scans the spot irradiated position S also in the Z-direction while scanning the spot irradiated position S in the Y-direction. In other words, after detecting the light L at the spot irradiated position S with the photodetector unit 3, the apparatus 100 scans the spot irradiated position S in the Y-direction with the XY-scanning unit and scans the spot irradiated position S in the Z-direction with the Z-scanning unit. At that time, the apparatus 100 may shift the spot irradiated position S in the Z-direction after shifting the spot irradiated position S in the Y-direction or may shift the spot irradiated position S in the Y-direction and the Z-direction at the same time to shift the spot irradiated position S diagonally.

Upon completion of the shifting of the spot irradiated position S, the photodetector unit 3 detects the light L to acquire data. This allows information of the light L at spot irradiated positions S at different Z-coordinates and X-coordinates or Y-coordinates to be acquired. The apparatus 100 can thus acquire XY-two-dimensional image data in which information of the light L generated from irradiated positions S at different Z-coordinates is stored for each of the pixels in the XY plane by repeating the above operation until acquisition of data on a predetermined XY region is completed (S205). In other words, the XY-two-dimensional image data that the apparatus 100 acquires is two-dimensional image data on at least two pixels in each of which information of the light L generated from irradiated positions S at different Z-coordinates is stored. In other words, XY-two-dimensional image data that forms an image stores a plurality of Z-coordinate values distributed for each pixel in an XY plane. Examples of data formation include a formation in which different Z-coordinates are stored at random in the individual pixels in an XY plane and a formation in which regularly different Z-coordinates between adjacent pixels are stored.

The operation performed when the apparatus 100 acquires XY-two-dimensional image data in the second measuring mode is not limited to the above specific example. In other words, when the apparatus 100 acquires XY-two-dimensional image data by scanning the spot irradiated position S in the X-direction and the Y-direction, the spot irradiated position S is scanned also in the Z-direction before the scanning in the X-direction and the Y-direction is completed. At that time, the light L may be detected at a plurality of Z-coordinates for one measurement point (a pixel) in an XY plane. The number of Z-coordinates at that time is set smaller than the number of Z-coordinates in the entire scanning range in the Z-direction. The apparatus 100 can thus reduce the number of measurement points by acquiring the XY-two-dimensional image data in this way, compared with a case in which XY-two-dimensional image data is acquired at all Z-coordinates. Here, the "measurement point" is a point of the spot irradiated position S at which data is to be acquired with the data acquisition unit 5.

For example, suppose that, when the operator sets the Z-direction scanning range of the spot irradiated position S to include ten measurement points via the instruction input unit 72, acquisition of data from a measurement point at the same X-coordinate and Y-coordinate is performed only at one Z-coordinate. This allows the apparatus 100 of this embodiment to reduce the number of measurement points to one tenth the prior art in which XY-two-dimensional image data is acquired for each Z-coordinate. In other words, the apparatus 100 can thin out signals corresponding to an XYZ three-dimensional space for the Z-coordinate to reflect it to an XY two-dimensional plane. This allows this embodiment to reduce the time required for acquiring image data to about one tenth.

Some spot irradiated positions S are not located in the specimen 6, from which the light L derived from the specimen 6 cannot be acquired. In such a case, the apparatus 100 may complement it with a signal intensity at a point of adjacent measurement points from which the light L derived from the specimen 6 can be acquired.

Thus, even if the specimen 6 is "wavy", the apparatus 100 can fast acquire XY-two-dimensional image data that roughly describes the shape of the specimen 6 by acquiring XY-two-dimensional image data in a single field of view.

Upon completion of acquisition of XY-two-dimensional image data from a single field of view (Yes at S205), the apparatus 100 moves the specimen stage 2 in the X-direction or the Y-direction (S207). This causes the field of view to shift in the XY-direction.

The apparatus 100 repeats the acquisition of XY-two-dimensional image data in each field of view while repeating the shifting of the field of view in the X-direction or the Y-direction. The data acquisition unit 5 combines the acquired plurality of pieces of XY-two-dimensional image data to generate large-area XY-two-dimensional image data. The apparatus 100 can thus acquire XY-two-dimensional image data on an area larger than a single field of view.

A way for moving a field of view in the X-direction or the Y-direction is not limited to a particular way. For example, after a field of view is shifted in sequence in the X-direction, and the field of view is shifted a predetermined number of times, the field of view is shifted in the Y-direction by one and is then shifted in sequence in the X-direction again. In other words, the field of view may be scanned using raster scanning. The number of fields of view in the X-directions and the Y-direction may be set so that the fields of view are accommodated in the entire specimen 6. For example, the number of fields of view may be determined according to the size of large-area XY-two-dimensional image data to be acquired, for example, 10 mm for each of the X-direction and the Y-direction.

Upon completion of acquisition of XY-two-dimensional image data on a predetermined entire area by repeating the above operation (Yes at S206), the XY-scanning of the spot irradiated position S with the optical scanner 12 is stopped (S208). Thereafter, the shifting of the spot irradiated position S in the Z-direction with the specimen stage 2 is stopped (S209).

By acquiring XY-two-dimensional image data in a single field of view in this way, the apparatus 100 can fast acquire XY-two-dimensional image data that roughly describes the shape of the specimen 6 even if the specimen 6 is "wavy". In particular, to acquire XY-two-dimensional image data on a large area having many fields of view, the effects of reduction in measurement time for the individual fields of view are added up, enhancing the advantages of this embodiment.

In this way, the apparatus 100 acquires a plurality of pieces of XY-two-dimensional image data while moving the field of view in the X-direction or the Y-direction and combines the data to generate large-area XY-two-dimensional image data. This allows large-area XY-two-dimensional image data that roughly describes the shape of the specimen 6 to be acquired fast even if the specimen 6 is "wavy". In other words, the apparatus 100 of this embodiment reduces the time required for acquiring image data.

Even if the XY-two-dimensional image data on the individual fields of view is rough image data, as described above, it is not a serious problem in roughly determining the state and shape of the specimen 6 for the entire area on the basis of final large-area XY-two-dimensional image data. If an objective lens with a numerical aperture (NA) of about 1 is used, the size of a spot is generally smaller than or equal to 1 $\mu m^3$. Therefore, the interval between measurement points is normally set at 1 $\mu m$ or less. The spot size depends on the wavelength and NA; if the NA is small, the spot size is large, but about 10 $\mu m^3$ at most. Therefore, even if pixels in which data from the specimen 6 is not stored in an image acquired from a large area of about 10 mm square, which is 1,000 or more times larger than the spot size, the entire shape is not seriously influenced.

Thus, the apparatus 100 according to this embodiment can reduce the time required for acquiring large-area XY-two-dimensional image data. Furthermore, the apparatus 100 can reduce the amount of image data to be acquired, reducing the cost and time for calculation for analyzing image data using a multivariate analysis technique or the like.

Second Embodiment

Figure 4A:
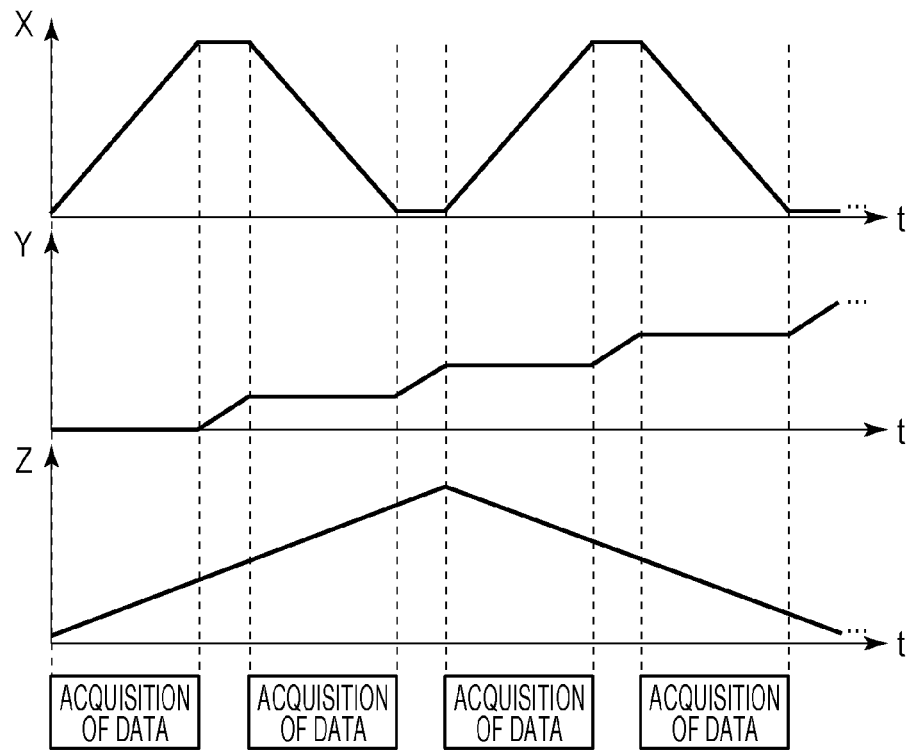
FIG. 4A is a diagram schematically illustrating changes in spot irradiated position with time and the data acquisition timing according to a second embodiment of the present invention.
Figure 4B:
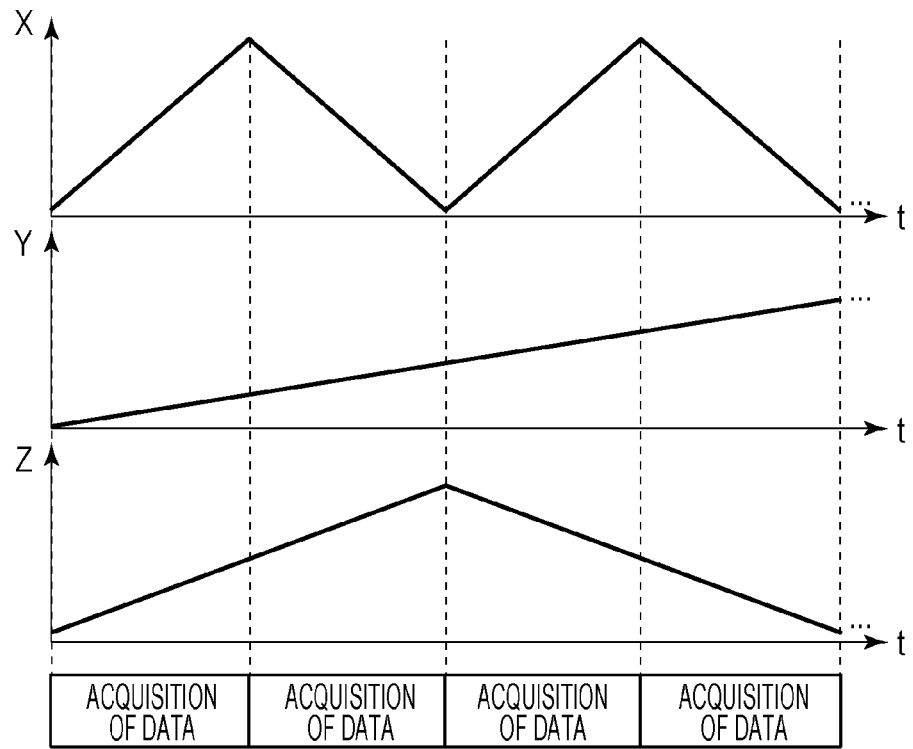
FIG. 4B is a diagram schematically illustrating changes in spot irradiated position with time and the data acquisition timing according to the second embodiment.

Next, an apparatus 200 according to a second embodiment will be described. Descriptions of the configuration and the operation of the apparatus 200 in the first measuring mode will be omitted because they are the same as those of the apparatus 100, and difference in operation in the second measuring mode will be described with reference to FIGS. 4A and 4B and FIGS. 5A and 5B. FIGS. 4A and 4B are diagrams schematically illustrating changes in spot irradiated position S with time and data acquisition timing of the apparatus 200 in the second measuring mode.

The apparatus 100 operates so that the spot irradiated position S is scanned in the Z-direction with the Z-scanning unit while the spot irradiated position S is scanned in one of the X-direction and the Y-direction with the XY-scanning unit. However, the apparatus 200 so operates that the spot irradiated position S is scanned in the Z-direction with the Z-scanning unit while the spot irradiated position S is scanned in the X-direction with the XY-scanning unit and while the spot irradiated position S is scanned in the Y-direction with the XY-scanning unit.

In other words, in the first embodiment, the spot irradiated position S is scanned in the Z-direction and in the Y-direction or the X-direction after completion of scanning of the spot irradiated position S in the X-direction or the Y-direction. However, in this embodiment, the spot irradiated position S is scanned in the Z-direction before completion of scanning of the spot irradiated position S in the X-direction or the Y-direction.

FIG. 4A schematically illustrates an example of changes in spot irradiated position S with time and the data acquisition timing of the apparatus 200 in the second measuring mode. In other words, the apparatus 200 scans the spot irradiated position S in the Z-direction during scanning in the X-direction. The apparatus 200 also scans the spot irradiated position S in the Z-direction during scanning in the Y-direction.

Figure 5A:
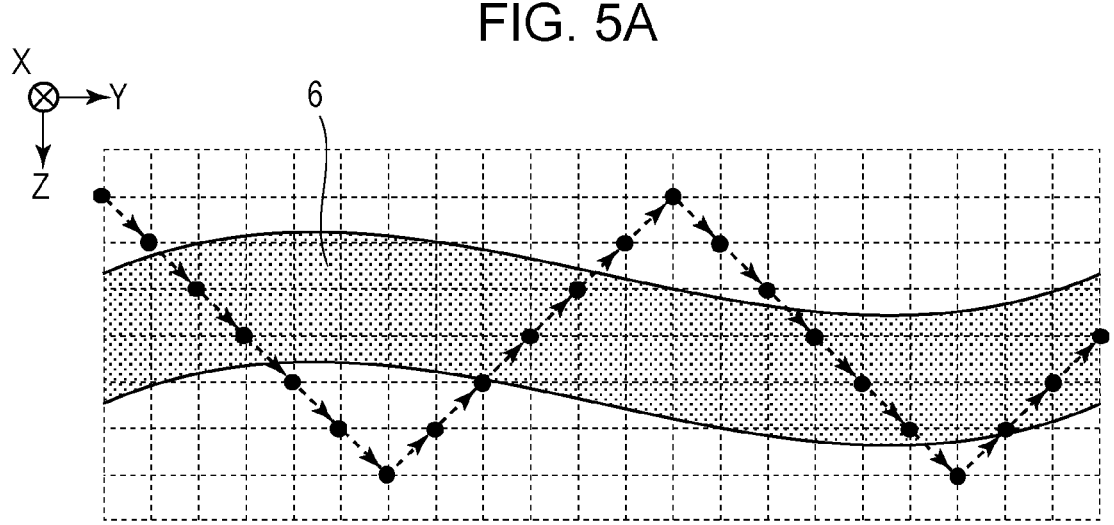
FIG. 5A is a diagram schematically illustrating a change in the position of the measurement point according to the first embodiment.
Figure 5B:
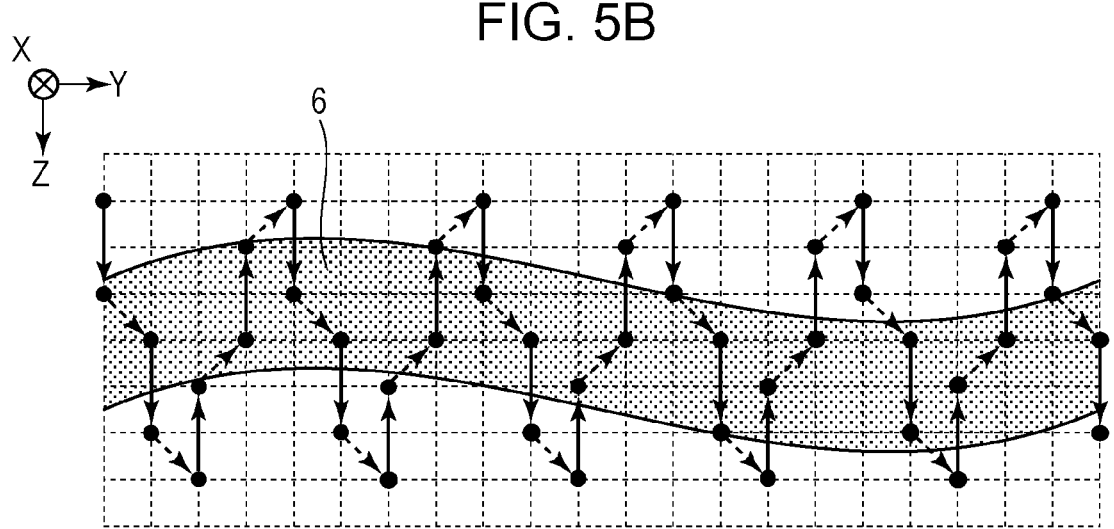
FIG. 5B is a diagram schematically illustrating a change in the position of the measurement point according to the second embodiment.

FIG. 5A is a diagram schematically illustrating a change in the position of the measurement point when the apparatus 100 does not scan the spot irradiated position S in the Z-direction during scanning in the X-direction and scans in the Z-direction during scanning in the Y-direction. FIGS. 5A and 5B are diagrams viewed from the X-direction. At the individual measurement points (black dots), the spot irradiated position S is scanned to the depth or the front in the plane of the drawing, that is, in the X-direction (not shown in FIG. 5A).

In contrast, FIG. 5B is a diagram schematically illustrating a change in the position of the measurement point when the apparatus 200 scans the spot irradiated position S in the Z-direction during scanning in the X-direction and the Y-direction. The solid arrows in FIG. 5B indicate the scanning locus of the spot irradiated position S in the X-direction.

Both in FIG. 5A and FIG. 5B, a state in which the measurement point is present in the specimen 6 and a state in which no measurement point is present in the specimen 6 alternate. However, in FIG. 5B, the state in which the measurement point is present in the specimen 6 and the state in which no measurement point is present in the specimen 6 alternate more frequently (the second embodiment, the apparatus 200) than FIG. 5A (the first embodiment, the apparatus 100). In other words, the apparatus 200 scans the spot irradiated position S in the Z-direction more frequently than the apparatus 100. This allows the apparatus 200 to acquire information in the Z-direction more uniformly than the apparatus 100, which could depend on the kind and shape of the specimen 6, allowing acquisition of XY-two-dimensional image data that describes the shape of the specimen 6 more finely.

FIG. 4B schematically illustrates another example of changes in spot irradiated position S with time and the data acquisition timing of the apparatus 200 in the second measuring mode. In other words, the apparatus 200 scans the spot irradiated position S in the Y-direction and the Z-direction at the same time during scanning in the X-direction. In this case, the time required for acquiring large-area XY-two-dimensional image data can be further reduced as compared with FIG. 4A.

Third Embodiment

Figure 6:
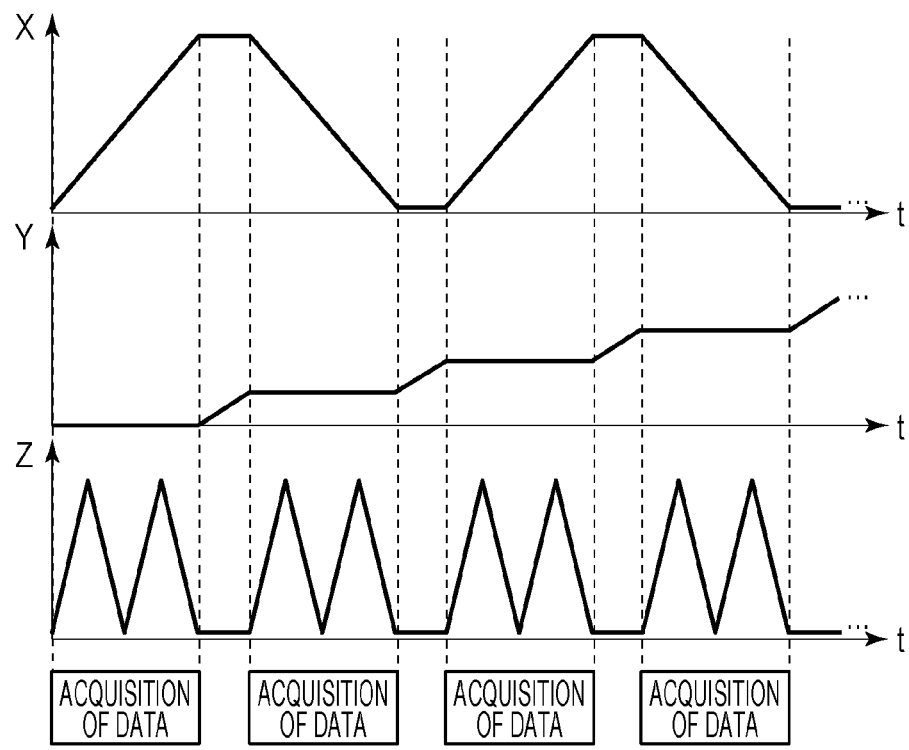
FIG. 6 is a diagram schematically illustrating changes in spot irradiated position with time and data acquisition timing according to a third embodiment of the present invention.

Next, an apparatus 300 according to a third embodiment will be described. Descriptions of the configuration and the operation of the apparatus 300 in the first measuring mode will be omitted because they are the same as those of the apparatus 100 (the first embodiment), and difference in operation in the second measuring mode will be described with reference to FIG. 6. FIG. 6 is a diagram schematically illustrating changes in spot irradiated position S with time and data acquisition timing of the apparatus 300 in the second measuring mode.

In the first and second embodiments, the frequency of scanning the spot irradiated position S in the Z-direction is set lower than or equal to the frequency of scanning in the X-direction or the Y-direction. However, in the third embodiment, the frequency of scanning the spot irradiated position S in the Z-direction is set higher than the frequency of scanning in the X-direction or the Y-direction.

FIG. 6 illustrates a case in which the spot irradiated position S is scanned in the X-direction and also in the Z-direction but is not scanned in the Z-direction during scanning in the Y-direction, as in the first embodiment. The third embodiment can also reduce the time required for acquiring large-area XY-two-dimensional image data, as in the first and second embodiments.

FIG. 6 shows a case in which the frequency of scanning the spot irradiated position S in the Z-direction is set four times the frequency of scanning in the X-direction. Setting the frequency of scanning the spot irradiated position S in the Z-direction higher than the frequency of scanning in the X-direction or the Y-direction increases the repetition frequency of scanning in the Z-direction. This increases the frequency of repetition of the state in which a measurement point is present in the specimen 6 and the state in which no measurement point is present in the specimen 6. This further enhances the uniformity of information on the Z-direction, providing XY-two-dimensional image data more finely describing the shape of the specimen 6.

This is a case in which the frequency of scanning the spot irradiated position S in the Z-direction is set higher than or equal to the frequency of scanning in the X-direction or the Y-direction in the first embodiment. However, an application to the second embodiment has the same effect.

Fourth Embodiment

Figure 7:
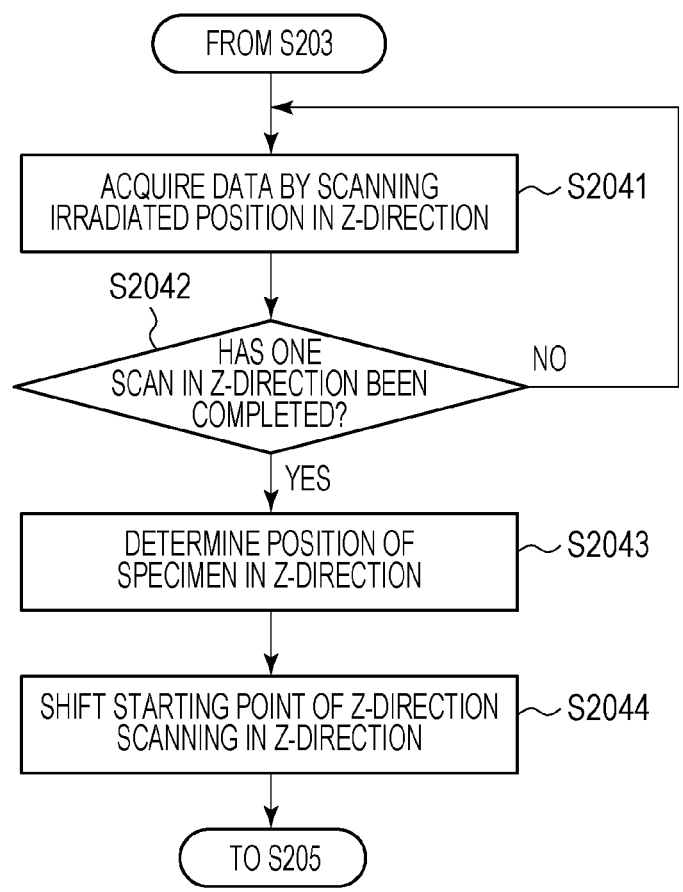
FIG. 7 is a flowchart illustrating the operation of a laser scanning microscope apparatus according to a fourth embodiment of the present invention in the second measuring mode.
Figure 8:
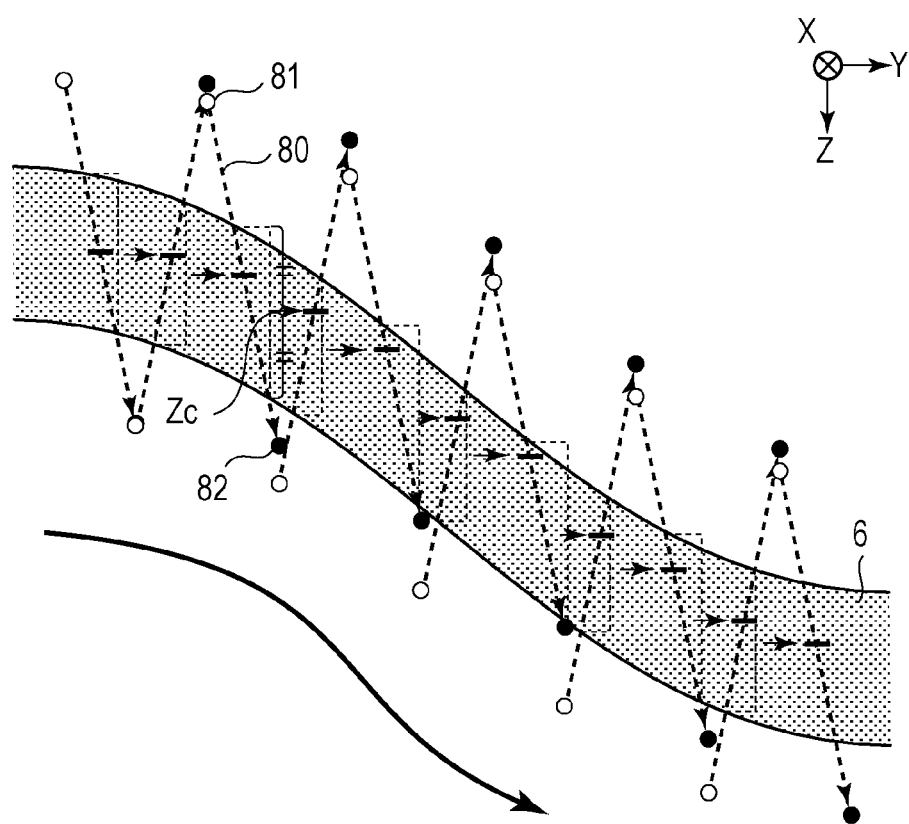
FIG. 8 is a diagram of the locus of the spot irradiated position according to the fourth embodiment, as viewed from an X-direction.

Next, an apparatus 400 according to a fourth embodiment will be described. Descriptions of the configuration and the operation of the apparatus 400 in the first measuring mode are omitted because they are the same as those of the first embodiment, and difference in operation in the second measuring mode will be described with reference to FIG. 7 and FIG. 8. FIG. 7 is a flowchart illustrating the operation of the apparatus 400 in the second measuring mode. FIG. 8 is a diagram of the locus of the spot irradiated position S in this embodiment, as viewed from the X-direction.

The apparatus 400 performs one scan (from a starting point 81 to a terminal point 82) of the spot irradiated position S in the Z-direction to determine the range of the Z-coordinate at which the specimen 6 is present. The apparatus 400 changes the starting point 81 or the terminal point 82 of the spot at which the next scan of the spot irradiated position S in the Z-direction is to be performed. This allows, even if the "waves" of the specimen 6 are large, measurement along the "waves". An example of this feedback control will be described with reference to the flowchart in FIG. 7.

FIG. 7 illustrates part of the flowchart in FIG. 2 (S204) in detail. The operation of the apparatus 400 is the same as the operation of the flowchart in FIG. 2 except for S204.

After starting to scan the spot irradiated position S in the Z-direction (S202) and starting to scan in the XY-direction (S203), the apparatus 400 acquires data while scanning the spot irradiated position S in the Z-direction (S2041). The spot irradiated position S is scanned reciprocally in the Z-direction. The operation of scanning and acquiring data is continued until the scanning in the Z-direction is completed for one scanning line 80. When the spot irradiated position S reaches the terminal point 82 to complete one scan in the Z-direction (Yes at S2042), the apparatus 400 determines the range of the Z-coordinate at which the specimen 6 is present on the basis of the data acquired along the scanning line 80 (S2043). The apparatus 400 shifts the starting point 81 of the scan in the Z-direction in the Z-direction so that the entire specimen 6 can be scanned at the spot in the Z-direction for the next scanning line 80 on the basis of the position of the spot in the specimen 6 acquired at S2043.

For example, to determine the range of the Z-coordinate at which the specimen 6 is present (S2043), the apparatus 400 calculates a central Z-coordinate Zc, as a Z-coordinate at which the center of the specimen 6 is present, from the Z-coordinates of a plurality of measurement points from which signals having values exceeding a predetermined threshold are acquired. The apparatus 400 then shifts the starting point 81 of Z-direction scanning in the Z-direction so that the central Z-coordinate Zc agrees with the Z-coordinate of the center of the next scanning line in the Z-direction (the Z-coordinate of the center between the starting point 81 and the terminal point 82), as shown in FIG. 8 (S2044).

Even if the specimen 6 has large "waves", this allows measurement along the "waves" of the specimen 6. Furthermore, in this embodiment, the width of scanning in the Z-direction can be set smaller than that in the first to third embodiments. This reduces a situation in which the spot irradiated position S is not in or on the specimen 6, thus reducing measurement points at which data on the specimen 6 cannot be acquired. This allows acquisition of XY-two-dimensional image data that describes the shape of the specimen 6 more finely.

In this embodiment, the starting point 81 of scanning in the Z-direction is shifted in the Z-direction so that the Z-coordinate of the center of the next scanning line agrees with the position Zc. However, the present invention is not limited to the above. For example, the range of the presence of the specimen 6 in the Z-direction may be acquired from the Z-coordinates of a plurality of measurement points at which signals having values exceeding a predetermined threshold are acquired, and the starting point 81 of scanning in the Z-direction may be shifted in the Z-direction so that the Z-coordinate of the center of the next scanning line in the Z-direction falls within the acquired range.

Fifth Embodiment

Next, a laser scanning microscope apparatus 101 (hereinafter referred to as "apparatus 101") according to a fifth embodiment will be described.

Figure 9:
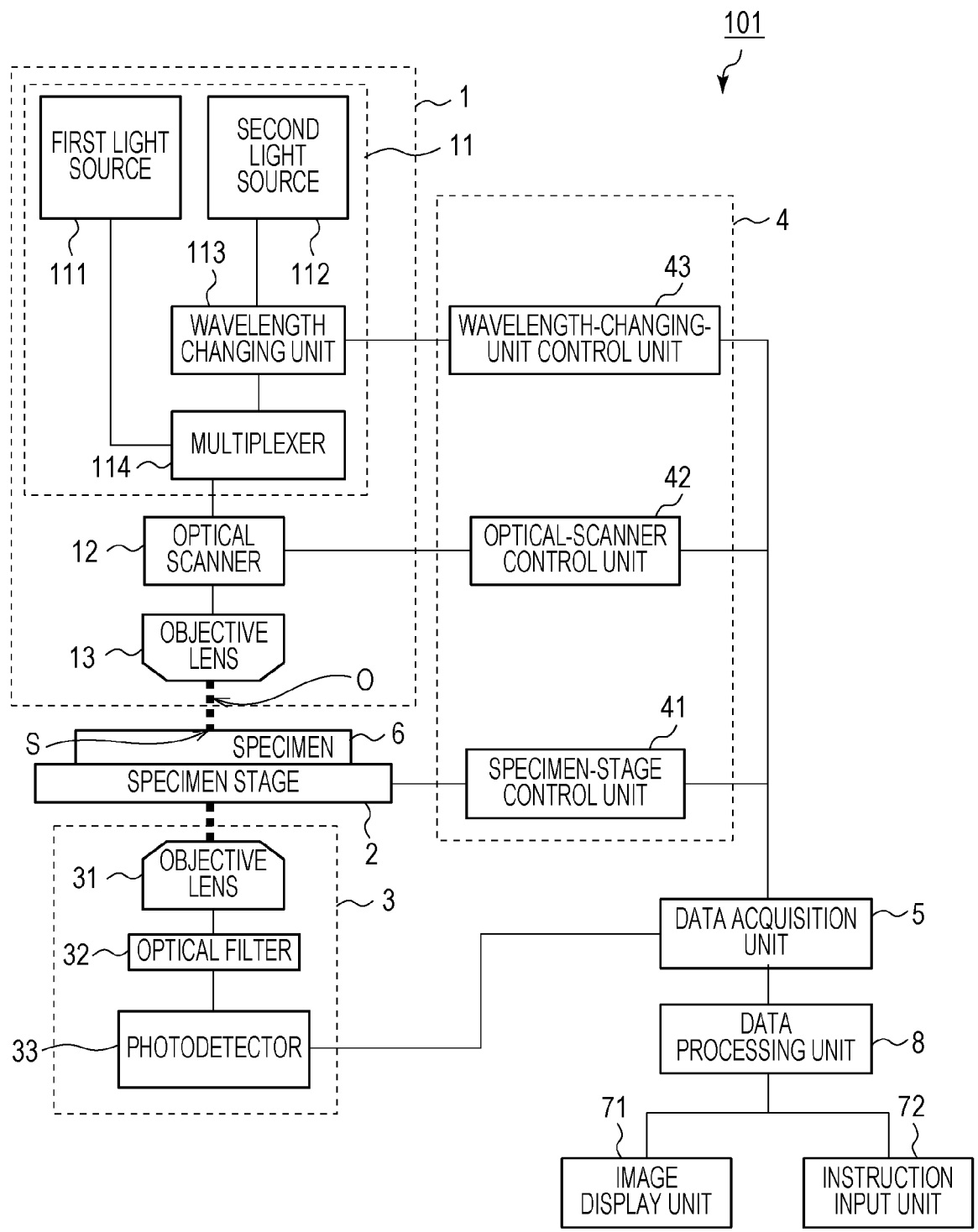
FIG. 9 is a diagram schematically illustrating the configuration of a laser scanning microscope apparatus according to a fifth embodiment of the present invention.

The configuration of the apparatus 101 will be described with reference to FIG. 9. FIG. 9 is a diagram schematically illustrating the configuration of the apparatus 101. The apparatus 101 can change the wavelength of light emitted from a light source unit 11 to the specimen 6.

In the fifth embodiment, the apparatus 101 performs measurement while changing the wavelength of light emitted to the specimen 6. In the fifth embodiment, even if the components of the specimen 6 are unknown, so that a wavelength suitable for light applied to the specimen 6 to acquire light L derived from the components of the specimen 6 is unknown, the apparatus 101 can acquire information on the distribution of the components of the specimen 6. It is rare that the components of the specimen 6 are unknown for the operator. The apparatus 101 can acquire spectral data at individual irradiated positions S by performing measurement while changing the wavelength of light applied to the specimen 6. The apparatus 101 can also acquire detailed information on the components of the specimen 6 by analyzing the spectral data.

The configuration of the apparatus 101 is the same as the configuration of the apparatus 100 except for the configurations of the light source unit 11 and a control unit 4, and only the configurations of the light source unit 11 and the control unit 4 will be described.

The light source unit 11 of the apparatus 101 includes a first light source 111, a second light source 112, a wavelength changing unit 113, and a multiplexer 114.

The first light source 111 and the second light source 112 are light sources that respectively emit a first laser beam and a second laser beam. The kind of laser beams emitted from the first light source 111 and the second light source 112 is not limited to particular light.

The wavelength changing unit 113 changes the wavelength of the second laser beam emitted from the second light source 112. In this embodiment, the second light source 112 is a broadband light source for generating light in which lights with a plurality of wavelengths are mixed. The wavelength changing unit 113 is a monochromator, which selects the second laser beam emitted from the second light source and outputs only light with a desired wavelength. The wavelength changing unit 113 of this embodiment can sweep the wavelength of emitted light at regular intervals. Examples of the wavelength changing unit 113 include a galvanometer scanner, a resonant scanner, an acousto-optic tunable filter, and a polyhedral mirror filter.

The multiplexer 114 combines the first laser beam emitted from the first light source and the second laser beam whose wavelength is changed by the wavelength changing unit.

Although this embodiment has a configuration in which the light source unit 11 includes two light sources: the first light source 111 and the second light source 112, the light source unit 11 may include only one light source or three or more light sources. Although this embodiment has a configuration in which the wavelength changing unit 113 changes the wavelength of the second laser beam, the wavelength changing unit 113 may change the wavelength of the first laser beam or both of the wavelengths of the first laser beam and the second laser beam.

The control unit 4 of the apparatus 101 includes a specimen-stage control unit 41, an optical-scanner control unit 42, and a wavelength-changing-unit control unit 43.

The apparatus 101 can change the difference (the wavelength difference) between the wavelength of the first laser beam and the wavelength of the second laser beam by changing the wavelength of the second laser beam with the wavelength changing unit 113. Although the following is a case in which the apparatus 101 changes the wavelength difference, the invention is not limited to the above configuration. The apparatus 101 may include a light source that emits light with a single wavelength, and the wavelength of the laser beam emitted from the light source may be changed.

Using near-infrared light as the first laser beam and the second laser beam allows nonlinear Raman scattered light, such as stimulated Raman scattered light and coherent anti-Stokes Raman scattered light, to be detected as the light L.

First Measuring Mode

The apparatus 101 in the first measuring mode detects the light L and acquires data n times while changing the above-described wavelength difference at individual spot irradiated positions S with the wavelength changing unit 113. The apparatus 101 scans the spot irradiated position S in the X-direction and the Y-direction with the XY-scanning unit while detecting the light L and acquiring data at the individual irradiated positions S. Thus, the apparatus 101 acquires spectral data at the individual irradiated positions S. Alternatively, the apparatus 101 may change the wavelength difference at timing at which image data on a single field of view is formed by performing X-scanning and Y-scanning of the spot irradiated position S with a single wavelength difference. In this case, the apparatus 101 changes the wavelength difference every time XY scanning is completed, and repeats XY-scanning n times.

The apparatus 101 in the first measuring mode thus acquires spectral data in which the intensity of the light L is stored for each of n kinds of wavelength difference at the individual irradiated positions S. Thus, the apparatus 101 can acquire "spectral image data" in which spectral data at the individual irradiated positions S are stored in the pixels corresponding to the XY-coordinates of the individual irradiated positions S.

The apparatus 101 can further acquire information on the distribution of the components of the specimen 6 by analyzing the acquired spectral image data with the data processing unit 8. The analysis with the data processing unit 8 can be performed using, for example, a multivariate analysis and machine learning.

Second Measuring Mode

In the second measuring mode, the apparatus 101 performs measurement at individual measurement points by using p kinds of wavelength difference among the n kinds of wavelength difference that the apparatus 101 uses in the first measuring mode (n>p≥1). This reduces the amount of spectral data acquired at individual irradiated positions S to p/n times.

When detecting XY-two-dimensional image data by scanning the light L while scanning the spot irradiated position S in the X-direction and the Y-direction, the apparatus 101 in the second measuring mode also scans the spot irradiated position S in the Z-direction, as in the other embodiments. This also reduces the time required for acquiring image data, as in the other embodiments. Furthermore, the apparatus 101 in the second measuring mode changes the wavelength difference between lights applied to the specimen 6 with the wavelength changing unit 113 while scanning the spot irradiated position S in the X-direction, the Y-direction and the Z-direction. In other words, the apparatus 101 changes the wavelength difference between the irradiation lights while scanning the spot irradiated position S in the X-direction and the Z-direction during acquiring XY-two-dimensional image data in a single field of view. Alternatively, the apparatus 101 changes the wavelength difference between the irradiation lights while scanning the spot irradiated position S in the Y-direction and the Z-direction during acquiring XY-two-dimensional image data in a single field of view. Alternatively, the apparatus 101 changes the wavelength difference between the irradiation light while scanning the spot irradiated position S in the X-direction, the Y-direction, and the Z-direction during acquiring XY-two-dimensional image data in a single field of view.

The apparatus 101 in the second measuring mode detects the light L and acquires data by changing p kinds of wavelength difference for use in measurement at individual measurement points at least once to acquire XY-two-dimensional image data. In changing p kinds of wavelength difference, either all of the p kinds of wavelength difference may be changed or part of the p kinds of wavelength difference may be changed. In other words, the apparatus 101 changes, of n kinds of wavelength differences that the apparatus 101 in the first measuring mode uses, the combination of p kinds of wavelength differences that the apparatus 101 in the second measuring mode uses for measuring the individual measurement points. Thus, the apparatus 101 acquires XY-two-dimensional image data in which information of the light L generated when light of different wavelength differences is applied to irradiated positions S at different Z-coordinates is stored for each pixel in an XY plane. In other words, XY-two-dimensional image data constituting one image stores a plurality of Z-coordinate values and a plurality of wavelength differences distributed from pixel to pixel in an XY plane. Examples of the configuration of the data includes a configuration in which different Z-coordinate values and different wavelength differences are stored at random in the pixels in an XY plane and a configuration in which Z-coordinates and wavelength differences which regularly differ between adjacent pixels are stored.

The number of times and timing the wavelength difference is changed are not limited to particular number and timing. For example, if the wavelength difference between irradiation lights is to be changed while the spot irradiated position S is being scanned in the X-direction and the Z-direction, p kinds of wavelength difference for use in measurement at individual measurement points is changed at least once in a single field of view while the spot irradiated position S is being scanned in the X-direction and the Z-direction. For example, if p=1, the measurement is performed using one kind of wavelength difference at individual spot irradiated positions S, and the wavelength difference is changed (n−1) times while a spot irradiated position S is scanned once in the X-direction and the Z-direction. The wavelength changing unit 113 may change the wavelength difference periodically.

Performing a measurement while changing the wavelength difference of light for use in measurement, as described above, can increase the kind of wavelength difference for use in acquiring XY-two-dimensional image data in a single field of view, compared with measurement using the same p kinds of wavelength difference for all measurement points in a single field of view. In the fifth embodiment, the number of kinds of wavelength difference for use in measurement can be larger than the number of p kind in the entire single field of view. This increases the possibility that signals from the components of the specimen 6 are acquired, as compared with measurement using the same p kinds of wavelength difference for all measurement points in a single field of view. This allows distribution information on the specimen 6 to be acquired even if the components of the specimen 6 are unknown, so that a wavelength appropriate for light applied to the specimen 6 to acquire the light L derived from the components of the specimen 6 is unknown.

This embodiment reduces the amount of spectral data acquired at individual irradiated positions S to p/n times. The amount of spectral image data acquired can also be reduced to p/n times as compared with the amount acquired by measurement at individual measurement points using n kinds of wavelength difference in the second measuring mode in the first to fourth embodiments. For example, suppose that the apparatus 101 is a stimulated Raman scattering microscope that detects stimulated Raman scattered light as the light L and acquires data by applying the first laser beam and the second laser beam to the specimen 6 while changing the wavelength difference 90 times in the first measuring mode. In this case, if p=1, the amount of spectral data acquired at individual irradiated positions S can be reduced to 1/91 times, and the amount of spectral image data can also be reduced to 1/91 times.

Furthermore, this embodiment reduces the time required for acquiring spectral data at individual measurement points to p/n times. This reduces the time required for acquiring spectral image data. In other words, under the above conditions, the time required for acquiring spectral data at individual measurement points can be reduced to 1/91 times as compared with measurement at individual measurement points using n kinds of wavelength difference. Furthermore, since this embodiment reduces the amount of spectral image data, the time required for analyzing spectral image data to generate image data describing the distribution of components is also reduced.

Thus, this embodiment reduces the amount of data without loss of the quality of acquired XY-two-dimensional image data as compared with the first to fourth embodiments in which the measurement at individual measurement points is performed in the second measuring mode using n kinds of wavelength difference.

The fifth embodiment is particularly effective in observation of a large area of the specimen 6. In the fifth embodiment, pixels in which the light L derived from the components of the specimen 6 is acquired and pixels in which the light L is not acquired coexist in a single field of view. However, this is not a serious problem in roughly acquiring the state and shape of the specimen 6 in a large-area image. Thus, this embodiment is effective because it allows the amount of data to be reduced with image quality necessary for wire-area observation.

Sixth Embodiment

Next, a laser scanning microscope apparatus 102 (hereinafter referred to as "apparatus 102") according to a sixth embodiment will be described.

Figure 10:
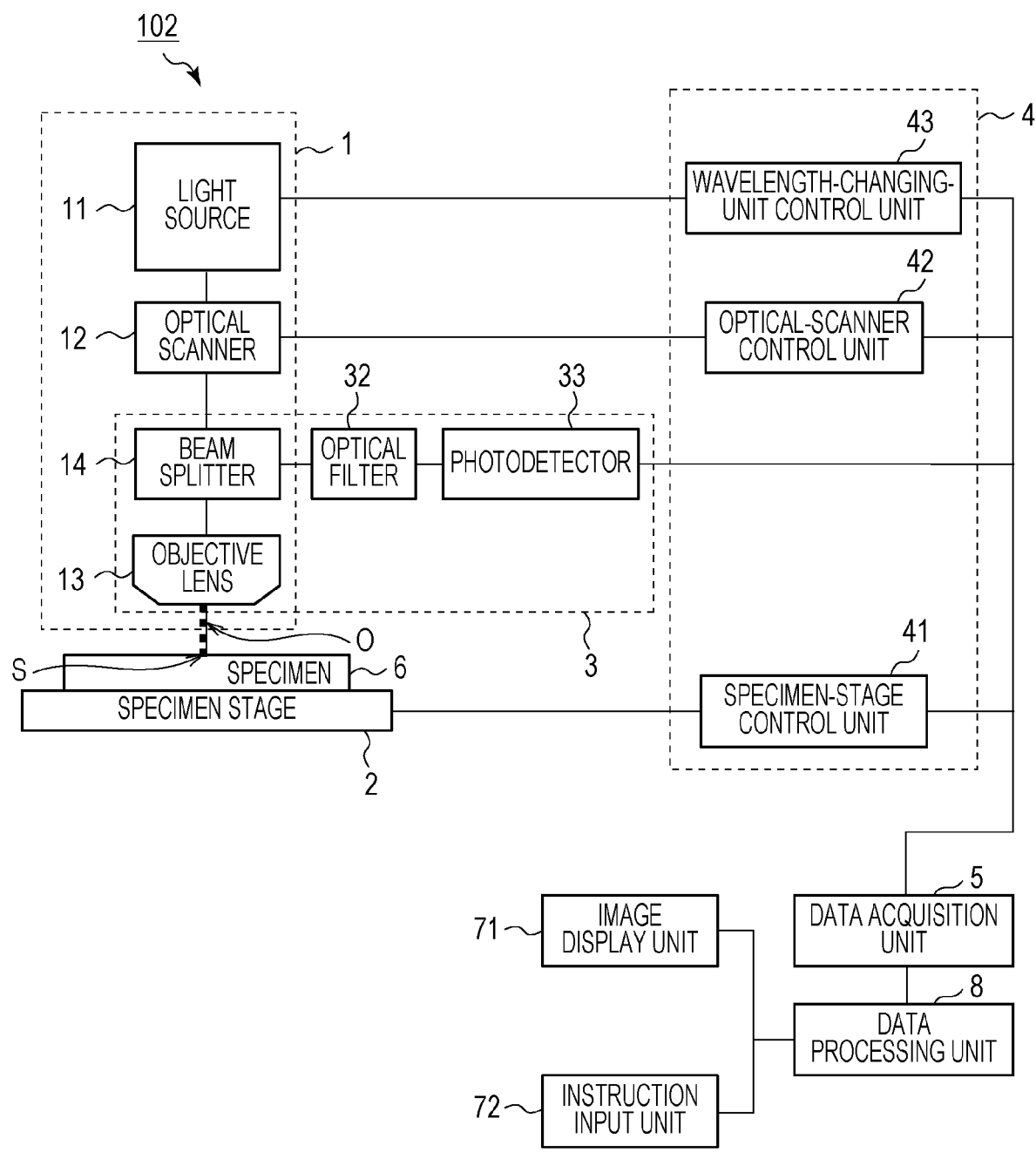
FIG. 10 is a diagram schematically illustrating the configuration of a laser scanning microscope apparatus according to a sixth embodiment of the present invention.

The apparatus 102 is a laser scanning microscope apparatus that detects reflected light as light L generated from a specimen 6. First, the configuration of the apparatus 102 will be described with reference to FIG. 10. FIG. 10 is a diagram schematically illustrating the configuration of the apparatus 102.

The configuration and the function of the apparatus 102 are substantially the same as those of the laser microscope apparatuses of the first to fifth embodiments except for the configuration and function of a photodetector unit 3, and the configuration of the photodetector unit 3 will be mainly described.

As in the above embodiments, the apparatus 102 applies a laser beam as a spot to at least part of the interior or the surface of the specimen 6 and detects fluorescence or the light L generated due to a nonlinear optical phenomenon from a position S irradiated with the laser beam. At that time, the light L is radiated in all directions from the generation source. Part of the light L passes through the specimen 6, but another part is radiated above the specimen 6 as scattered light. Of the light L, scattered light radiated in a direction perpendicular to the surface of the specimen 6 mixes with the reflected light of the laser beam incident on the specimen 6. Therefore, the photodetector unit 3 with a reflective configuration of this embodiment detects the scattered light or reflected light radiated above the specimen 6 and measures its change in intensity to thereby detect the light L. The reflective configuration has the advantage that even a specimen that is too thick to transmit scattered light can be measured.

As shown in FIG. 10, the photodetector unit 3 of this embodiment includes a beam splitter 14, an objective lens 13, an optical filter 32, and a photodetector 33. Among them, the objective lens 13 and the beam splitter 14 constitute part of an irradiation unit 1.

A laser beam emitted from a light source 11 passes through an optical scanner 12 and the beam splitter 14 and is focused with the objective lens 13 to the specimen 6. Light reflected from the specimen 6 is collected by the objective lens 13, part of which is reflected by the beam splitter 14 into the optical filter 32. The optical filter 32 transmits only light with the same wavelength as the wavelength of a first light beam, and the transmitted light enters the photodetector 33. The position of the beam splitter 14 and the position of the optical scanner 12 may be interchanged. The light source 11 may include a plurality of light sources, as the light source 11 of the apparatus 101 does.

The beam splitter 14 may be a polarization beam splitter. In this case, the direction of polarization transmission of the beam splitter 14 is aligned with the direction of polarization of the laser beam emitted from the light source 11 so that the laser beam from the light source 11 passes through the beam splitter 14. Of the scattered light radiated from the specimen 6, components that are not aligned with the direction of polarization of the laser beam emitted from the light source 11 are reflected by the beam splitter 14 into the optical filter 32 and then enters the photodetector 33. If the light source 11 includes a plurality of light sources, the optical filter 32 transmits only light with the same wavelength as the wavelength of the first light.

To detect the light L, the light scattered by the specimen 6 may be directly detected. In this case, a collecting optical system for collecting the scattered light is disposed in addition to the objective lens 13 for incident light. The light collected by the collecting optical system enters the optical filter 32, and light that has passed through the optical filter 32 enters the photodetector 33.

The photodetector unit 3 may not include the collecting optical system to make the photodetector unit 3 compact and to efficiently detect the scattered light. In this case, the optical filter 32 and a photodetecting device that constitutes the photodetector 33 are disposed close to the specimen 6 so that the scattered light directly enters the optical filter 32. For example, the optical filter 32 and the photodetecting device are layered and disposed, outside the objective lens 13, in the vicinity of the opening of the objective lens 13. Alternatively, the optical filter 32 or the photodetecting device may be disposed in the objective lens 13.

Part of an optical path between the light source 11 and the objective lens 13 or part of an optical path between the objective lens 13 (or the collecting optical system) and the photodetector 33 may be constituted of optical fibers. In this case, a moving mechanism may be disposed not for the specimen stage but for the objective lens 13 to shift the laser scanning area.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-086266, filed Apr. 20, 2015, and No. 2016-020932, filed Feb. 5, 2016, which are hereby incorporated by reference herein in their entirety.

What is claimed is:

1. A laser scanning microscope apparatus comprising:
a first light source configured to emit a first laser beam;
a second light source configured to emit a second laser beam;
a wavelength changing unit configured to change a wavelength of at least any one of the first laser beam and the second laser beam so as to change a difference in wavelength between the first laser beam and the second laser beam;
a multiplexer configured to multiplex the first laser beam and the second laser beam to form the laser beam;
an objective lens configured to focus the laser beam to form a focused spot;
a photodetector unit configured to detect light including a stimulated Raman scattered light generated from a position irradiated with the focused spot of the laser beam;
a scanner configured to change a path of the laser beam so as to scan a position of the focused spot, within a field of view of the objective lens, in an X-direction perpendicular to an optical axis of the objective lens and in a Y-direction perpendicular to the optical axis;
a Z-scanning unit configured to change a position of the focused spot in a Z-direction parallel to the optical axis of the objective lens a plurality of times during scanning in the X-direction or in the Y-direction, so as to encompass an expected thickness in the Z-direction of the specimen and traverse the thickness of the specimen a plurality of times within the field of view;
a control unit configured to control the scanner and the Z-scanning unit so as to control the position of the focused spot and the relative position of the specimen, and to control an XY position of the field of view of the objective lens relative to the specimen;
a data acquisition unit configured to acquire detected signal from the photodetector unit in association with an X-coordinate and a Y-coordinate of the irradiated position of the focused spot as pixel information; and
a data processing unit configured to store the pixel information and acquire XY two dimensional image for an area of the specimen in association with a plurality amount of the fields of view of the objective lens,
wherein the apparatus is configured to acquire XY-two-dimensional image data and Z-coordinate information acquired by detecting the light while changing the wavelength of the laser beam with the wavelength changing unit while the irradiated position is scanned in at least one of the X-direction, the Y-direction, and the Z-direction.

2. The laser scanning microscope apparatus according to claim 1, wherein the wavelength changing unit is configured to periodically change the wavelength of the laser beam.

3. The laser scanning microscope apparatus according to claim 1,
wherein the scanner is configured to periodically scan the irradiated position in the X-direction and the Y-direction, and
wherein the Z-scanning unit is configured to periodically scan the irradiated position in the Z-direction.

4. The laser scanning microscope apparatus according to claim 3, wherein the scanner is configured to scan the irradiated position in the X-direction and the Y-direction at longer intervals than intervals at which the Z-scanning unit is configured to scan the irradiated position in the Z-direction.

5. The laser scanning microscope apparatus according to claim 3, wherein the Z-scanning unit is configured to periodically scan the irradiated position in the Z-direction by vibrating the specimen in the Z-direction.

6. The laser scanning microscope apparatus according to claim 1, wherein the Z-scanning unit is configured to change the Z-coordinate of a starting point of the scanning of the irradiated position in the Z-direction based on an intensity of the light detected by the scanning of the irradiated position in the Z-direction.

7. The laser scanning microscope apparatus according to claim 1, wherein the XY-two-dimensional image data comprises spectral image data in which spectral data storing an intensity of the light with respect to the wavelength of the laser beam is stored for each of the pixels.

8. The laser scanning microscope apparatus according to claim 7, wherein the a data processing unit configured to process the spectral image data by a multivariate analysis.

9. The laser scanning microscope apparatus according to claim 1, wherein the light that the photodetector unit detects comprises at least one selected from transmitted light, reflected light, and scattered light generated from the irradiated position.

10. The laser scanning microscope apparatus according to claim 1, further comprising at least one of an optical filter and a spectroscope located in an optical path between the objective lens and the photodetector unit,
    wherein the at least one of the optical filter and the spectroscope has an optical filtering property which allows one component of a pair of wavelengths included in the detected light to propagate and prohibit the other components of the pair of wavelengths included in the detected light from propagating.

\* \* \* \* \*